United States Patent
Belkin et al.

(10) Patent No.: US 7,200,417 B2
(45) Date of Patent: Apr. 3, 2007

(54) METHOD AND APPARATUS FOR REFORMATTING CALLER IDENTIFICATION FROM DIFFERENT COMMUNICATION NETWORKS

(75) Inventors: Anatoly S. Belkin, Glenview, IL (US); Peter P. Hux, Dowers Grove, IL (US); Zaffer S. Merchant, Parkland, FL (US)

(73) Assignee: Motorola, Inc., Schaumburg, IL (US)

( * ) Notice: Subject to any disclaimer, the term of this patent is extended or adjusted under 35 U.S.C. 154(b) by 202 days.

(21) Appl. No.: 10/629,890

(22) Filed: Jul. 29, 2003

(65) Prior Publication Data

US 2005/0026648 A1    Feb. 3, 2005

(51) Int. Cl.
*H04Q 7/20*    (2006.01)
*H04Q 7/38*    (2006.01)

(52) U.S. Cl. .............. 455/552.1; 455/550.1; 455/564; 455/558; 455/422.1; 455/415; 455/403; 455/551; 379/353; 379/354; 379/355.01; 379/355.02

(58) Field of Classification Search .......... 455/403, 455/414.1, 415, 414.4, 422.1, 552.1, 550.1, 455/553.1, 426.1, 426.2, 445, 500, 517, 566; 379/352, 353, 354, 355.01, 355.02
See application file for complete search history.

(56) References Cited

U.S. PATENT DOCUMENTS

| | | | |
|---|---|---|---|
| 6,052,451 A * | 4/2000 | Boero et al. ........... | 379/142.06 |
| 6,449,475 B1 | 9/2002 | Chinnaswami ............. | 455/415 |
| 2002/0013163 A1* | 1/2002 | O'Prey ...................... | 455/558 |
| 2004/0198427 A1* | 10/2004 | Kimbell et al. .......... | 455/556.1 |
| 2005/0020286 A1* | 1/2005 | Lazaridis et al. ........... | 455/466 |

* cited by examiner

*Primary Examiner*—Keith Ferguson

(57) ABSTRACT

A communication device (200) operates on a plurality of communication networks (104, 110) and utilizes a method (400) for reformatting a caller identification received from one communication network (110) to match the caller identification format of a second communication network (104). The reformatted caller identification can be used to match an address book entry (318) or for dialing a call using the second communication network (104). A communication controller (300) is also used to provide the reformatted caller identification in an alternate embodiment.

24 Claims, 4 Drawing Sheets

METHOD AND APPARATUS FOR REFORMATTING CALLER IDENTIFICATION FROM DIFFERENT COMMUNICATION NETWORKS

FIELD OF THE INVENTION

This invention relates in general to communication systems, and more specifically to a method and apparatus for reformatting caller identification from or operating on a plurality of communication networks.

BACKGROUND OF THE INVENTION

Communication devices that are capable of operating on more than one communication network exist. There are cases where two communication networks supporting such a communication device can have different dialing plans, for example, one communication network may be a wide area system and require 10 digits for dialing. The other communication network may be a local network, such as used in an enterprise, and may require only 5 digits for dialing. It is also often true that when receiving calls from these disparate communication networks that the caller identification (caller ID) numbers received with an incoming call will reflect the dialing plan of the communication network where the call originated. Using the same example, calls from the wide area communication network may be accompanied by a 10 digit caller ID while calls from the local communication network can be 5 digits.

This can create various problems, for example, when trying to match names to an internal phone book with an entry for one network but using the caller ID from another network. Another issue arises when making or returning a call using a caller ID from one network, but due to a change in location, the second network is used to make the call. If the caller ID does not match the number of digits needed for dialing using the second network, the call can fail, for having too many digits and calling a wrong number or for having too few digits to complete the dial sequence. Furthermore, the user may prefer a particular caller ID regardless of the network used for placing the call.

Clearly a need exists for a method and apparatus for reformatting a caller identification when operating on a plurality of communication networks.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages in accordance with the present invention.

DETAILED DESCRIPTION OF PREFERRED EMBODIMENT

In overview, the present disclosure concerns communication systems or networks and communications devices that are operable on more than one communication network and more particularly communications devices operable on multiple networks when these communication networks have differing caller identification formats.

The principles discussed are applicable to many communications systems or networks and communications devices, including those devices operable on different networks with different caller identification formats or dialing plans, such as when one network is a public wireless carrier, such as a cellular service carrier, and the other network is a private communication system as supported, for example, on a corporation's enterprise wireless local area network.

As further discussed below various inventive principles and combinations thereof are advantageously employed to ensure that a communication device capable of providing service on multiple communication networks correctly identifies callers and uses valid call addressing when making calls while moving between such communication networks, provided these principles or equivalents thereof are utilized.

The present disclosure is provided to further explain in an enabling fashion the best modes of making and using various embodiments in accordance with the present invention. The disclosure is further offered to enhance an understanding and appreciation for the inventive principles and advantages thereof, rather than to limit the invention in any manner. The invention is defined solely by the appended claims including any amendments made during the pendency of this application and all equivalents of those claims as issued.

It is further understood that the use of relational terms, if any, such as first and second, top and bottom, and the like are used solely to distinguish one from another entity or action without necessarily requiring or implying any actual such relationship or order between such entities or actions.

Much of the inventive functionality and many of the inventive principles are best implemented with or in software programs or instructions and integrated circuits (ICs) such as application specific ICs. It is expected that one of ordinary skill, when guided by the concepts and principles disclosed herein, will be readily capable of generating such software instructions and programs and ICs with minimal experimentation. Therefore, in the interest of brevity and minimization of any risk of obscuring the principles and concepts in accordance to the present invention, further discussion of such software and ICs, if any, will be limited to the essentials with respect to the principles and concepts of the preferred embodiments.

Figure 1:
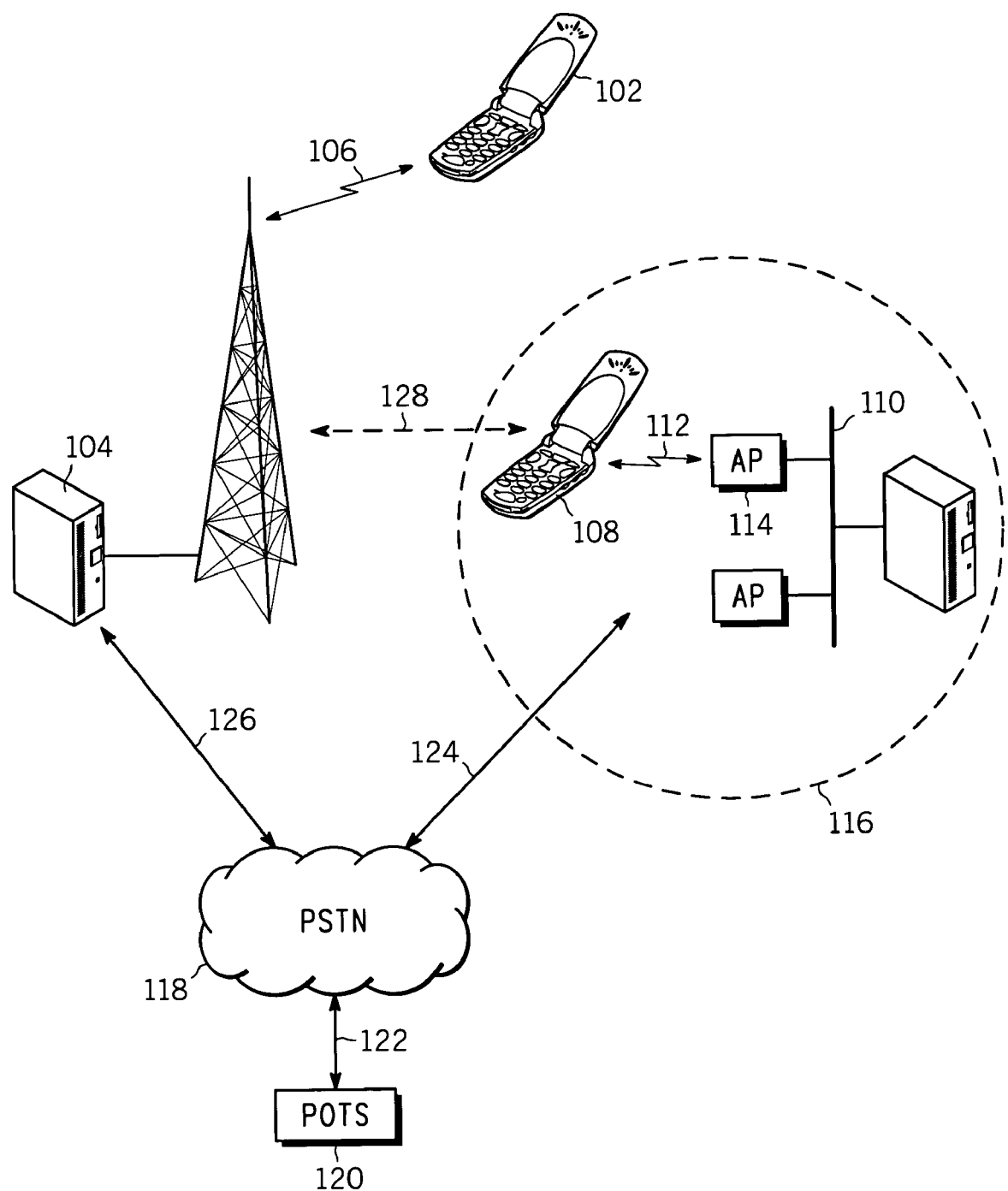
FIG. 1 depicts, in a simplified and representative form, a block diagram of a plurality of communication networks and interconnections thereof.

Referring to FIG. 1, a simplified and representative diagram of a plurality of communication networks and interconnections thereof will be discussed and described. A communication device 102 is able to send and receive communications such as voice and data over a first communication network 104 and its associated communication channel 106. A second communication device 108 is supported by a second communication network 110 comprising short range radio frequency links 112 supported by one or more access points 114. The communication network 110 typically supports communication over a limited coverage area 116. It is not important that the first and second communication networks 104, 110 are dissimilar, only that they have or support different caller identification formats. In a preferred embodiment the first communication network 104 is a wide area network (WAN) such as a cellular system and would typically support over the air protocols such as CDMA, TDMA, GSM and 3G. In the same preferred embodiment the second communication network 110 is a wireless local area network (WLAN) using, for example, over the air protocols such as 802.11 (WiFi), Bluetooth, HiperLan, etc. In alternative embodiments either of the networks 104, 110 can be public or private networks using various air interface technologies.

A public switched telephone network 118 (PSTN) is capable of supporting communication over a variety of channels 122 including wire line, integrated services digital network (ISDN), and voice over Internet protocol (VoIP). The PSTN 118 couples communication devices such as plain old telephone sets 120 (POTS) and other subscriber devices to the first and second communication networks 104, 110 via connections 124, 126, which are typically high capacity trunked lines. The two communication devices 102, 108 can be the same or functionally similar in that either device can operate on both networks 104, 110. As depicted, for example, the communication device 108 is shown communicating or possibly communicating with the first communication network 104 over channel 128.

Communication devices 102, 108 that are capable of supporting multiple communication networks and protocols are available from manufacturers, such as Motorola, Inc. The other elements of FIG. 1 are known and available. The communication network 104 or infrastructure is represented by systems available from Motorola as exemplified by the iDEN™ communication system or other cellular systems and typically includes a radio access network, base site controllers and switches, among other equipment.

The communication network 110 or infrastructure comprises radio frequency access points 114 available from suppliers such as Proxim, and a backbone network, typically Ethernet running terminal control protocol/Internet protocol (TCP/IP), supported by switches and routers available from Cisco and others. The communications network 110 also typically includes a server or network controller for managing the communication functions. The servers are available from manufacturers such as Sun Microsystems and Hewlett Packard with Solaris or HPUX operating systems or from Dell and other manufacturers using the Windows operating system from Microsoft. The software for supporting the communication channel 112 can be developed using C, C++, Java or the like by one of ordinary skill in the software arts familiar with communication systems or can be purchased from companies such as Motorola.

The PSTN 118 can be a standard wire line telephone infrastructure including switches, routers and the like that are available from companies such as Lucent and Tellabs. The plain old telephone set 120 is available from AT&T and other manufacturers at retail outlets nationwide. Communication devices similar to POTS 120, but serving the same function using Integrated Services Digital Networks (ISDN), voice over Internet Protocol (VoIP) or wireless handsets may also be serviced by the PSTN network in alternate embodiments. Such equipment is available from communications suppliers and computer dealers.

Figure 2:
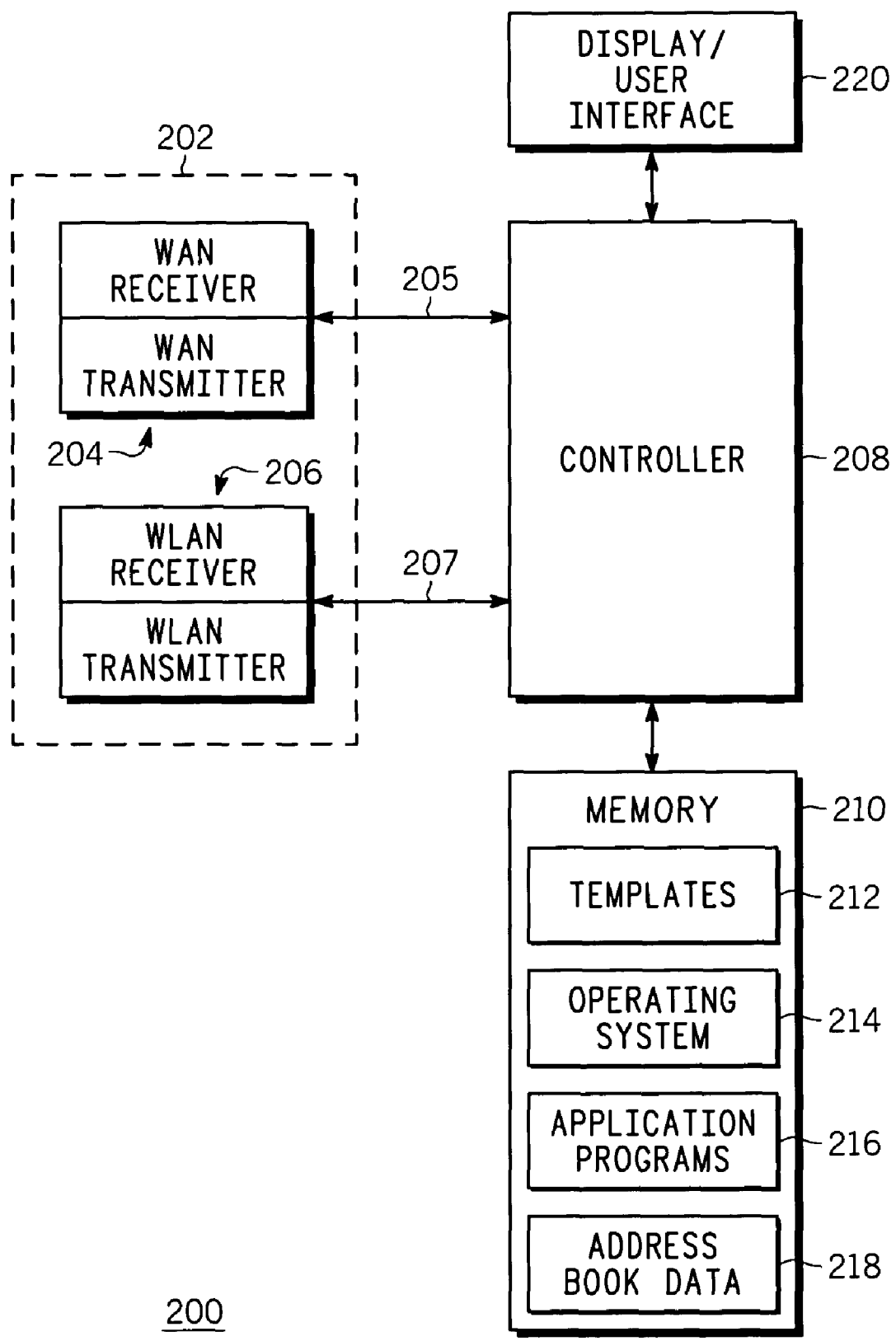
FIG. 2 depicts, in a simplified and representative form, a block diagram of a communications device for reformatting a caller identification.

Referring to FIG. 2, a simplified and representative a block diagram of a communications device 200 that is arranged and constructed to reformat or for reformatting a caller identification will be discussed and described. A transceiver 202 is composed of at least one transmitter/receiver 204 (shown as a WAN receiver and transmitter) but may have one or more additional transmitter/receivers 206 (shown as a WLAN receiver and transmitter). In one embodiment, one transmitter/receiver 204 is for communicating over a wide area network (WAN) while another transmitter/receiver 206 is for communicating over a wireless local area network (WLAN). The transceiver 202 is coupled to a controller 208 at input/outputs 205, 207. The controller 208 comprises or is coupled to a memory 210 for storing information including templates 212 for use in caller identification reformatting, the communication device's operating system 214, application programs 216, one of which can include an address book program that uses memory for storing address book data 218. A display and user interface 220 coupled to the controller is suitable for displaying a variety of information, including caller identification information and otherwise supporting interaction with a user of the device.

In operation, the communication device 200 is, as discussed above, capable of operating on more than one communication network 104, 110. The transceiver 202 communicates with both the first 104 and second 110 communication networks. Each communication network 104, 110 supplies a caller identification to the communication device 200. In conventional systems, the caller ID is provided between the first and second ring tone and may be transmitted in a number of different formats. The caller identification format will often match the dialing plan of the communication network providing the caller ID. For example, if the first communication network 104 requires 10 digits for dialing, it is likely that the caller ID supplied by that network will be a 10 digit number. If the second communication network 110 operates on a local private branch exchange (PBX) and uses a 5 digit dialing plan, the caller ID supplied by the PBX will likely be 5 digits.

The communication device 200 is free to roam between coverage areas of the first 104 and second 110 communication networks transparent to a user of the communication device 200 such that it may not be obvious to the user from which communication network a call is received or on which communication network an outbound call will be made.

As described above, when attempting to make a call on a system with a 5 digit dialing plan using a 10 digit caller ID from an alternate communication network, the call attempt will likely fail. For this reason, the controller 208 is programmed to provide a reformatted caller identification that corresponds to the caller identification received from the first communication network such that the reformatted caller identification or format thereof corresponds to the format for the caller identification of the second communication network. In the case where the call is received from the second network a similar reformatting may take place to accommodate the dialing plan of the first network. Note that the designation first and second is for clarity only and that in the examples mentioned above the first communication network can be either a cellular communication network or a private network such as a WLAN.

In the simplest form, reformatting the caller ID may be accomplished by a simple adjustment of the number of digits or characters used from the received caller ID, for example, truncating from 10 digits to 5, as in 847 576 4491->64491. More often, it is likely that a template 212 for number matching can be employed to provide the reformatted caller ID. For example, a 5 digit caller ID "64491" is received by the communication device 200. The matching process will use a template 212, for example, a GSM international format "+1 847 576 xxxx", where the number 6 in the fifth position from the right is used to match the incoming caller ID from the second network, i.e. "64491," to the template 212 of the first network and reformat it to "+1 847 576 4491."

When the caller ID has been reformatted as discussed above it is now suitable for use in addressing a call or other outbound communication using the cellular network, i.e. 12 characters. That is, where a 5 digit number would not be suitable to complete a call on a GSM cellular network, the reformatted number is suitable for addressing the call. In the communication device 200, the templates 212 can be programmed as part of the provisioning process or another updating step when the device is moved from single communication network service to multiple communication network support. Note that the templates can be updated or new templates or translation rules can be downloaded from the appropriate network to the communications device using known over-the-air programming techniques. Since the dialing plan and caller ID formats of participating systems are or will be known at the time of provisioning or updating, the task of setting up templates is straightforward and does not require undue experimentation, if any. Note that the communications device may utilize more than two communications networks.

The particular format for the caller ID that is sent to a called party can and normally is specific to the network that is being utilized for placing the corresponding call. The caller ID format and thus address for that caller can be automatically selected by the communications device based on a desired network or network that is being accessed together with user preferences as indicated via the user interface or as otherwise programmed into the communications device. Alternatively, the caller ID format can be selected by the user via the user interface prior to placing a call, dependent, for example, on what network is used for the call and in appropriate systems regardless of what network is used. For further clarification, the communications device 200 may modify or reformat caller IDs that are received contingent on the network where the device is currently operating, either automatically or at the user's discretion. For example, if the communications device is operating on a WAN network, such as network 104 and receives a call that originated with a private WLAN network, such as network 110, the device volitionally or at the user's beckon can reformat the caller ID to be compatible with the WAN in the event a return call is made, whereas if the device is operating on the WLAN and receives the same caller ID, no reformatting would be required or indicated.

A further use for the reformatted caller ID is in matching an address book 218 entry in the communication device 200. To achieve the most general use of an address book, it is advantageous to store address book telephone number entries using the most complete form of the number, in our example, "+1 847 576 4491." When a caller ID is received from the WLAN communication network comprising a 5 digit caller ID, i.e. "64491" the address book entry may not be found by a standard look up function. When the reformatted caller ID is used, the address book entry matching process is straightforward, since the caller ID and address book entry are likely to be an exact match.

After the match of an address book entry, either the reformatted caller ID or the name from the matching address book entry can be displayed on the display 220 of the communication device 200. This is useful in helping the user of the communication device 200 to identify the source of the call.

The communication device 200 is similar or identical to the communication device 108 and is available from manufacturers like Motorola, however the functionality of these devices will need to be modified according to the principles and concepts disclosed and described herein in order to enjoy the advantages noted. The WAN receiver and transmitter 204 are typical in the commercial cellular industry and are available as components from companies such as Motorola. The WLAN receiver and transmitter 206 are typically IEEE 802.11 (WiFi) compliant and are available as a chip set from Proxim and other manufacturers. The controller 208 is or may include a digital signal processor, available from Motorola's Semiconductor Products Sector or other vendors. The memory 210 can include both volatile and non-volatile memory and is often integral to the controller 208 but may also be external. The display and user interface 220 is comprised of commonly available parts such as in general a display, a keypad, and audio transducers. The display/user interface 220 is comprised of commodity products readily available requiring limited skill in the art to integrate into the communication device 200.

Figure 3:
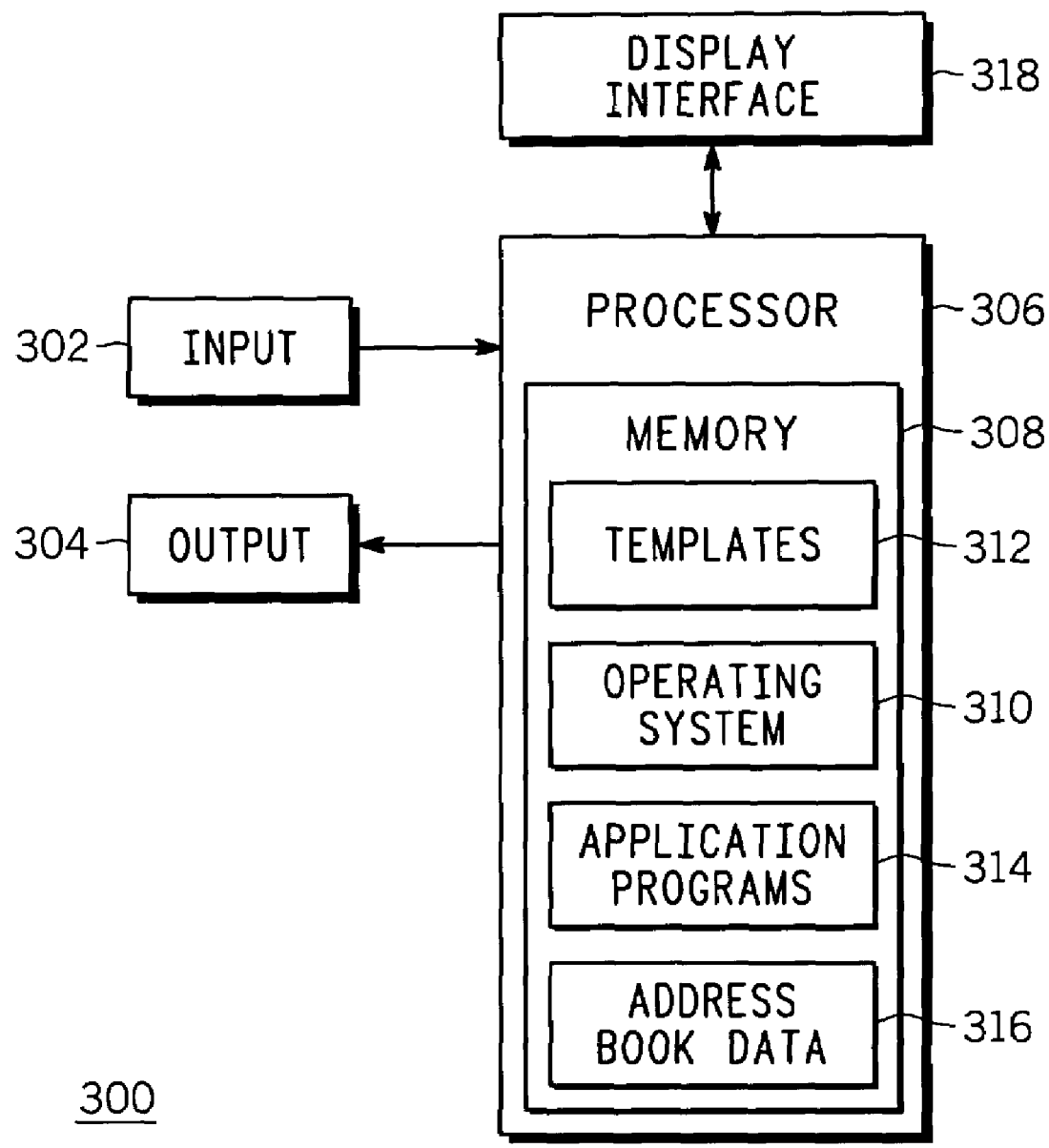
FIG. 3 depicts, in a simplified and representative form, a block diagram of a communications controller for reformatting a caller identification.

Referring to FIG. 3 a simplified and representative block diagram of a communications controller 300 that is arranged, constructed, and configured for reformatting or to reformat a caller identification will be discussed and described. The communications controller 300 is comprised of an input 302 for receiving or to receive a caller identification or caller ID data associated with or comprising a portion of an incoming call or communication from one of a plurality of communication networks 104, 110. The controller is also comprised of an output 304 to provide or for providing a reformatted caller identification for use, for example, in addressing an outbound communication. The input 302 and output 304 are coupled to a processor 306 that further comprises a memory 308. The memory is used for a variety of purposes, such as storing an operating system 310 or similar executable for managing the basic functions of the communication controller 300.

The memory can also be used for storing templates 312 for use by the processor to reformat or for reformatting the caller ID. The templates 312 may be programmed at the time the controller and its encompassing communication device 200 are provisioned into or activated on one or more communication networks 104, 110. The memory 308 can also provide storage for application programs 314, for use in programming templates 312 or for providing an address book, whose address book data 316 is also stored in the memory 308. The communications controller 300 is further comprised of a display/interface 318 coupled to the processor for driving a display and otherwise supporting a user interface.

The communications controller 300 can be or comprise a digital signal processor for decoding received signals but may also be comprised of a standalone microcontroller. Microcontrollers and digital signal processors suitable for use as the communications controller are available from Motorola's Semiconductor Products Sector and other manufacturers. The memory can be comprised of both volatile and non-volatile memory and may be contained within the processor 306 or external to it or a combination of both. Programming the communications controller can be done in C, C++, Java, or a native language, such as assembler, targeted to the particular processor. The programming of such a controller is a common task within the scope of skills of a software programmer of ordinary skill in the art with some experience in communication system development.

In operation, the communication controller 300 receives an incoming call via the input 302 comprising a caller ID as a part of the call. The processor 306, responsive to functions in the operating system 310 or one of the application programs 314 reformats the caller ID by, for example, adjusting the number of characters of the caller ID so that the number of characters received on one communication network matches the number of characters that would be expected if the call had originated from another communication network. For example, a 5 digit caller ID received from a private WLAN 110 supporting a communication network and protocol, is adjusted to match the number of characters that would be expected if the call had originated from a public WAN 104 having a communication protocol supporting a 10 digit caller ID.

To perform the reformatting, the processor 306 may rely on a template 312 for adjusting the number of characters in the caller ID as explained above with reference to FIG. 2. For example, a 5 digit caller ID "64491" is received via the input 302. The matching process will use the template 312, for example, a GSM protocol having an international format "+1 847 576 xxxx", where the number 6 in the fifth position from the right is used to match the incoming caller ID from the second network, i.e. "64491" utilizing the template 312 corresponding to the first network and thus reformat the 5 digit caller ID to "+1 847 576 4491." The output 304 can be used by the processor to provide the reformatted caller ID for addressing an outbound communication, that is, to make or originate a call. As noted above and in an analogous fashion a further use for the reformatted caller ID is in matching an address book entry 316 in the communication controller 300.

Note that the communications controller as operationally or functionally described above can advantageously be used in a communications device, such as communications device 200 or within a network controller (controlling entity) or peripheral entity associated with the network controller for one of the plurality of communications networks discussed above with reference to FIG. 1.

Figure 4:
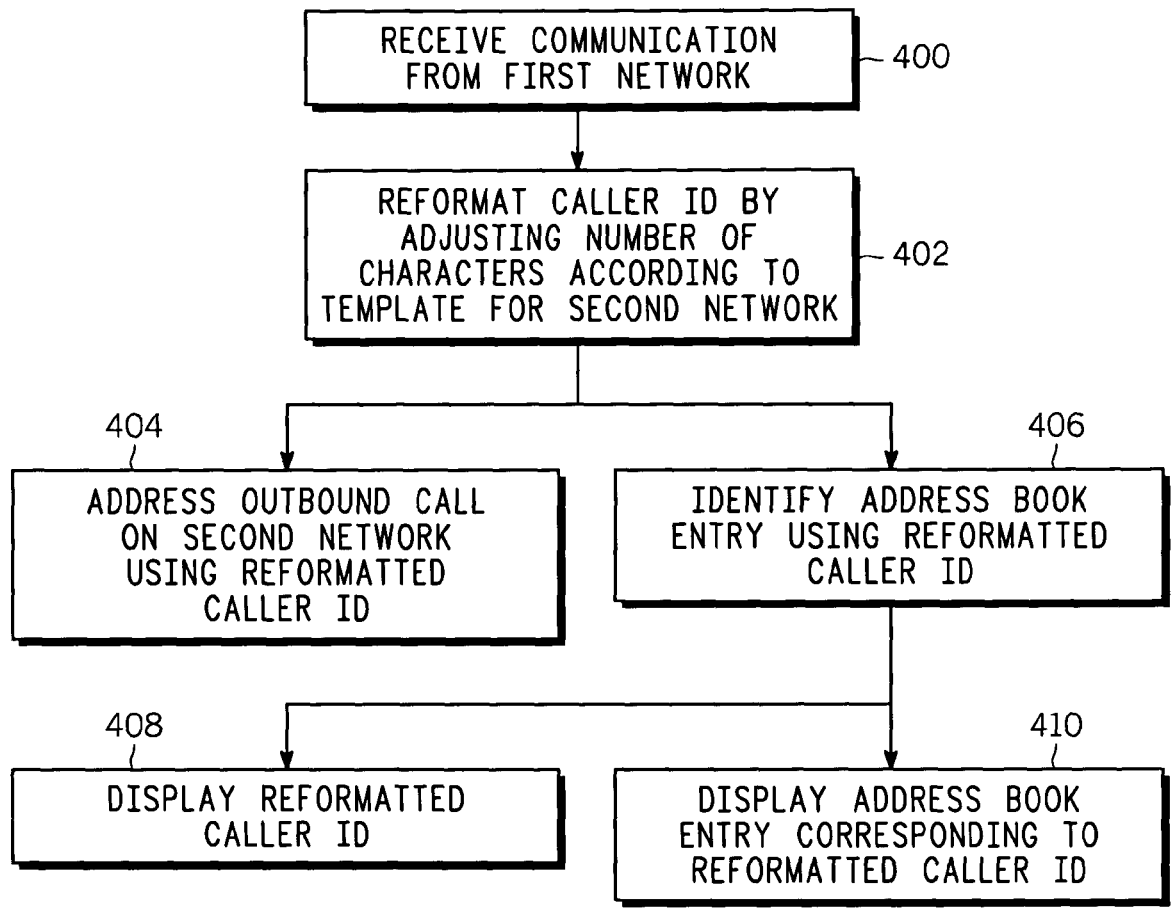
FIG. 4 is a method for use by a communication device for reformatting and using a caller identification when operating with a plurality of networks.

Referring to FIG. 4, a method for reformatting and using a caller identification when operating with a plurality of networks is discussed and described. A communication is received 400 from one of a plurality of communication networks 104, 110 where the communication comprises the caller identification. The caller identification is reformatted 402 to provide a reformatted caller identification. As described above, the reformatted caller identification corresponds to a caller identification format for an other of the plurality of communication networks. For example, when a call is received from a first communication network supporting a 5 digit caller identification, the caller identification can be reformatted to match the format of a second communication network, having an 11 digit caller identification format. The reformatting can be accomplished by use of a template for matching one or more characters of the received caller identification and substituting for missing numbers or characters or removing extra numbers or characters, that is, by adjusting the number of characters in the caller identification.

Following the reformatting at 402 the method can branch to first provide the reformatted caller identification for addressing 404 an outbound communication and second to use the reformatted caller identification for identifying 406 an address book entry 318. The method can again branch to display 408 the reformatted caller identification or to display 410 the address book entry 318 corresponding to the reformatted caller identification. The branch can occur based on predetermined criteria such as whether the address book entry exists or if there are ambiguities regarding which address book entry to associate with the reformatted caller identification or simply as a matter of user preference. For example, several names may be associated with a corporate phone number such that when a call is received from the corporation, a single entry cannot be ascertained. With some question open as to who the caller is, only the caller identification may be selected for display.

The processes, apparatus, and systems, discussed above, and the inventive principles thereof are intended to alleviate problems caused by the operation of a communication device 200 with multiple communication networks 104, 110 having differing caller identification formats and differing dialing plans. Using these principles of reformatting the caller identification from one communication network to match the caller identification format of another communication network facilitates both the usefulness of making calls on either network and of correctly identifying a caller using an internal phone book application. The inventive use of the template 212 for matching incoming caller identification numbers to a required format helps to shield users of the communication device 200 from the need to know what communication network is actually supporting an incoming or proposed outgoing call.

Various embodiments of a method and apparatus for reformatting a caller identification when operating on a plurality of communication networks to the significant advantage of a user thereof have been discussed and described. It is expected that these embodiments or others in accordance with the present invention will have application to many combinations of wide area and local area communication networks that provide for mobility of their user or subscriber communication devices between such communication networks. The disclosure extends to the constituent elements or equipment comprising such systems and specifically the methods employed thereby and therein. Using the inventive principles and concepts disclosed herein advantageously allows or provides increased flexibility and utility for users wishing to take advantage of the coverage and economic benefits of using communication devices capable of operating on a plurality of communication networks, particularly a mix of WANs and WLANs.

This disclosure is intended to explain how to fashion and use various embodiments in accordance with the invention rather than to limit the true, intended, and fair scope thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. A communication device for reformatting a caller identification when operating with a plurality of communication networks comprising:
   a transceiver for communicating with a first and second communication network wherein the first communication network uses a first caller identification and the second communication network uses a second caller identification, wherein the first caller identification has a first format used by the first communication network and the second caller identification has a second format used by the second communication network different from the first format; and a controller, coupled to the transceiver, to provide a reformatted caller identification by reformatting the caller identification for use by the communication device by matching a format of the caller identification to one the first format and the second format based on a one of the first communication network and second communication network used by the transceiver.

2. The communications device of claim 1 wherein the reformatted caller identification is provided by adjusting the number of characters of the first caller identification.

3. The communications device of claim 1 further comprising a memory for storing a template, wherein the reformatted caller identification is provided according to the template and the template corresponds to a difference between the first format and the second format.

4. The communications device of claim 1 wherein the first communication network is one of a cellular communication network and a private network.

5. The communications device of claim 1 wherein the reformatted caller identification is used for addressing an outbound communication sent via the transceiver.

6. The communications device of claim 1 further comprising an address book wherein the controller identifies an address book entry corresponding to the reformatted caller identification.

7. The communications device of claim 1 further comprising a display for displaying one of the reformatted caller identification and an address book entry corresponding to the reformatted caller identification.

8. The communications device of claim 1 wherein the controller provides the reformatted caller identification only when received from the first communication network.

9. The communications device of claim 1 further comprising a user interface and wherein rules used by the controller to provide the reformatted caller are supplied from one of the user interface and a communications network.

10. A communication controller arranged to reformat a caller identification comprising:

an input to receive one of a first caller identification used by a first communication network and a second caller identification used by a second communication network, the first and second caller identification comprising at least a portion of an incoming call from the first communication network or second communication network;

a processor to reformat the caller identification; and an output to provide a reformatted caller identification, wherein the reformatted caller identification is formatted according to one of a first and second format by matching the caller identification to one of the first caller identification and the second caller identification based on a one of the first communication network and the second communication network used by the controller.

11. The communication controller of claim 10 wherein the reformatted caller identification is provided by adjusting the number of characters of the caller identification.

12. The communication controller of claim 10 further comprising a memory for storing a template, wherein the reformatted caller identification is provided according to the template.

13. The communication controller of claim 10 wherein the first format corresponds to a public wide area communication network and the second format corresponds to a private local area communication network.

14. The communication controller of claim 10 wherein the reformatted caller identification is used for addressing an outbound communication.

15. The communication controller of claim 10 further comprising an address book wherein the controller identifies an address book entry corresponding to the reformatted caller identification.

16. The communications controller of claim 10 further comprising an interface to a display for providing one of the reformatted caller identification and an address book entry corresponding to the reformatted caller identification.

17. The communications controller of claim 10 utilized in one of communications device and network controller.

18. A method for reformatting a caller identification for use by a wireless communication device when operating with at least one of a first communication network and a second communication network comprising:

receiving a communication from one of the first and second communication networks, the communication comprising the caller identification wherein the caller identification corresponds to one of a first format used by the first communication network and a second format used by the second communication network; and reformatting the caller identification to provide a reformatted caller identification, the reformatted caller identification corresponding to a caller identification format for an other of the plurality of communication networks by matching the caller identification to one of the first format and second format based on a one of the first communication network and second communication network used by the wireless communication device.

19. The method of claim 18 wherein the reformatting the caller identification further comprises:

adjusting a number of characters of the caller identification.

20. The method of claim 18 further comprising:

reformatting the caller identification according to a stored template corresponding to the one of the first format or the second format used by the wireless communication device.

21. The method of claim 18 further comprising:

addressing an outbound communication using the reformatted caller identification.

22. The method of claim 18 further comprising:

identifying an address book entry corresponding to the reformatted caller identification.

23. The method of claim 18 further comprising:

displaying one of the reformatted caller identification and an address book entry corresponding to the reformatted caller identification.

24. The method of claim 18 utilized in one of a communications device and a network controller.

* * * * *